United States Patent
Borsos et al.

(10) Patent No.: US 9,215,603 B2
(45) Date of Patent: Dec. 15, 2015

(54) TECHNIQUE FOR CONTROLLING AND HANDLING PROBE TUNNEL SET UP

(75) Inventors: Tamas Borsos, Budapest (HU); Åsa Bertze, Spånga (SE); András Veres, Budapest (HU)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 60 days.

(21) Appl. No.: 14/007,277

(22) PCT Filed: Mar. 28, 2011

(86) PCT No.: PCT/EP2011/001551
§ 371 (c)(1),
(2), (4) Date: Nov. 26, 2013

(87) PCT Pub. No.: WO2012/130255
PCT Pub. Date: Oct. 4, 2012

(65) Prior Publication Data
US 2014/0086068 A1    Mar. 27, 2014

(51) Int. Cl.
| | |
|---|---|
| *H04L 12/46* | (2006.01) |
| *H04W 24/00* | (2009.01) |
| *H04W 24/06* | (2009.01) |
| *H04L 12/26* | (2006.01) |
| *H04W 76/02* | (2009.01) |

(52) U.S. Cl.
CPC ........... *H04W 24/00* (2013.01); *H04L 12/4633* (2013.01); *H04L 43/10* (2013.01); *H04L 43/12* (2013.01); *H04W 24/06* (2013.01); *H04L 43/087* (2013.01); *H04L 43/0811* (2013.01); *H04L 43/0829* (2013.01); *H04L 43/0852* (2013.01); *H04L 43/0888* (2013.01); *H04L 43/50* (2013.01); *H04L 2212/00* (2013.01); *H04W 76/022* (2013.01)

(58) Field of Classification Search
None
See application file for complete search history.

(56) References Cited

U.S. PATENT DOCUMENTS

| | | | |
|---|---|---|---|
| 7,590,725 B1 | 9/2009 | Harrison | |
| 2004/0106088 A1* | 6/2004 | Driscoll et al. | 434/118 |
| 2006/0143300 A1 | 6/2006 | See et al. | |
| 2007/0189189 A1 | 8/2007 | Andrews et al. | |

(Continued)

FOREIGN PATENT DOCUMENTS

| | | |
|---|---|---|
| KR | 20020091953 A | 12/2002 |
| WO | 0251181 A1 | 6/2002 |
| WO | 2008138509 A1 | 11/2008 |

OTHER PUBLICATIONS

Author Unknown, "Charter for Working Group," IP Performance Metrics (ippm). IETF Datatracker; 2011. pp. 1-2.

(Continued)

*Primary Examiner* — Kerri Rose
(74) *Attorney, Agent, or Firm* — Murphy, Bilak & Homiller, PLLC

(57) ABSTRACT

A technique for controlling and handling set up of a probe tunnel stretching from an access network node through a core network towards a core network node is described. In a method implementation, probe tunnel set up control comprises determining a First Fully Qualified Tunnel Endpoint Identifier (F-TEID) associated with the core network node and sending a probe tunnel set up instruction to the access network node. The instruction commands the access network node to locally set up the probe tunnel towards the core network node based on the F-TEID.

17 Claims, 6 Drawing Sheets

(56) References Cited

U.S. PATENT DOCUMENTS

| | | | |
|---|---|---|---|
| 2007/0195707 A1 | 8/2007 | Cidon et al. | |
| 2010/0260129 A1* | 10/2010 | Ulupinar et al. | 370/329 |
| 2011/0016209 A1* | 1/2011 | Moncaster et al. | 709/224 |
| 2011/0158171 A1* | 6/2011 | Centonza et al. | 370/328 |
| 2011/0222414 A1 | 9/2011 | Borsos et al. | |
| 2012/0087260 A1* | 4/2012 | Devarapalli et al. | 370/252 |

OTHER PUBLICATIONS

Author Unknown, "Service Assurance Agent (SAA)—Introduction," Cisco. IP Application Services. 2011. pp. 1-2.

3rd Generation Partnership Project, "3GPP TS 36.300 V10.2.0 (Dec. 2010)," 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10). Dec. 2012, pp. 1-14, 19-21, 130-131.

3rd Generation Partnership Project, "3GPP TS 29.274 V10.1.0(Dec. 2010)," 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 10). Dec. 2010, pp. 13-39, 131.

3rd Generation Partnership Project, "3GPP TS 23.401 V8.12.0 (Dec. 2010)," 3rd Generation Partnership Project; Technical Specification Group Services and System Aspects; General Packet Radio Service (GPRS) enhancements for Evolved Universal Terrestrial Radio Access Network (E-UTRAN) access (Release 8). Dec. 2012. pp. 1-242.

Author Unknown, "Handling of U-Plane in HeNB," Nokia Siemens Networks, Nokia. TSG-RAN WG3 Meeting #61bis; R3-082651; Sep. 30-Oct. 3, 2008. pp. 1-3. Prague, Czech Republic.

* cited by examiner

300

302 — DETERMINE A FIRST FULLY QUALIFIED TUNNEL ENDPOINT IDENTIFIER, OR F-TEID, ASSOCIATED WITH THE S-GW

304 — SEND A PROBE TUNNEL SET UP INSTRUCTION TO THE eNodeB FOR INSTRUCTING THE eNodeB TO LOCALLY SET UP THE PROBE TUNNEL TOWARDS THE S-GW BASED ON THE FIRST F-TEID

402 — RECEIVE A PROBE TUNNEL SET UP INSTRUCTION TO LOCALLY SET UP THE PROBE TUNNEL TOWARDS THE S-GW, WHEREIN THE INSTRUCTION IS ACCOMPANIED BY A FULLY QUALIFIED TUNNEL ENDPOINT IDENTIFIER, OR F-TEID, ASSOCIATED WITH THE S-GW

404 — SET UP THE PROBE TUNNEL TOWARDS THE S-GW BASED ON THE F-TEID ASSOCIATED WITH THE S-GW

Fig. 4

TECHNIQUE FOR CONTROLLING AND HANDLING PROBE TUNNEL SET UP

TECHNICAL FIELD

The present disclosure generally relates to the field of communication network probing. In particular, a technique for controlling the set up of a probe tunnel for network probing purposes is described.

BACKGROUND

Communication network probing is a technique increasingly used to monitor and analyze network traffic and transmission paths. The resulting insights are typically exploited by network operators for network management and optimization. As an example, network probing permits to identify possible bottlenecks within a communication network.

Network probing can be based on both live user traffic and dedicated probe (or test) traffic. For probe traffic generation specific test equipment, such as probe traffic generators, are installed at one or more network locations. The probe traffic generators are configured to initiate probe traffic communication with conventional network nodes, other probe traffic generators or special servers (such as reflectors). On the basis of the probe traffic, path properties such as packet loss, delay, jitter and throughput can be determined.

Network tunnels are transmission paths that require particular considerations when it comes to network probing. Generally, communication networks use tunneling protocols when a first network protocol (e.g., a delivery protocol) encapsulates a second network protocol (e.g., a payload protocol). As an example, the General Packet Radio Service (GPRS) Tunneling Protocol, also referred to as GTP, is a tunneling protocol used to transport in a GPRS core network user traffic between an access network and an external Packet Data Network (PDN) or another access network. The access network may be configured according to the Global System for Mobile Communication (GSM), Universal Mobile Telecommunications System (UMTS) or Long Term Evolution (LTE) specifications.

GTP is in fact a protocol suite that comprises multiple individual protocols, such as GTP-U and GTP-C. GTP-U is the user plane protocol applied to transport user data within the GPRS core network and between an access network and the core network. GTP-C, on the other hand, is the associated control plane protocol.

On the user plane, multiple tunnels may be set up for an individual user. Each tunnel is identified locally at a network endpoint by a Tunnel Endpoint Identifier (TEID). The TEIDs are randomly allocated by the tunnel endpoints. A Fully Qualified TEID (F-TEID) additionally contains address information (typically the Internet Protocol, or IP, address) of a given tunnel endpoint. Accordingly, a tunnel stretching between two endpoints can uniquely be identified by the F-TEID pair associated with the two end-points.

For network probing purposes, the GTP ECHO protocol permits to probe the connectivity between two devices supporting GTP. A network probing system on the basis of GTP ECHO messages is exemplarily described in WO 2008/138509 A.

It has been found that the end-to-end path from an access network via a core network to, for example, a PDN cannot yet be probed satisfactorily. This drawback can be attributed to the fact that tunnels specifically set up for probing purposes ("probe tunnels" hereinafter) do no route test traffic through certain network nodes that would need to be probed, such as Serving Gateways (S-Gws), Serving GPRS Support Nodes (SGSNs), PDN Gateways (P-Gws) and Gateway GPRS Support Nodes (GGSN). The same applies to network nodes above the P-Gw or GGSN (e.g., PDN servers on the Gi interface).

A further problem that has been observed is the fact that mobile communication systems often have two Transport Control Protocol (TCP)/IP layers. Most existing network probing solutions are only capable of probing the lower TCP/IP layer between two network nodes. This means that the upper TCP/IP layer that actually represents the end-to-end connectivity across the mobile communication system will not be probed.

To overcome this problem, mobile terminal-based probing solutions have been proposed to monitor the end-to-end connectivity. Such systems have the drawbacks that they consume precious radio resources and that they require additional hardware. As an alternative, an emulation of mobile terminals on the network side has been considered for end-to-end path probing. The emulation approach, however, necessitates the implementation of a complete mobile terminal stack and of user authentication mechanisms on the network side.

In sum, the presently available network probing approaches for tunnel-based transmission paths do not yet permit a satisfactory monitoring of an end-to-end connection and of individual network nodes in the core network. This drawback is based on the nature of the probe tunnels defining the transmission paths to be probed.

SUMMARY

There is a need for a technique to set up probe tunnels for an efficient network probing that avoids one or more of the problems identified above.

According to a first aspect, a method of controlling set up of a probe tunnel stretching from an access network node through a core network towards a core network node is proposed. The method comprises determining a first F-TEID associated with a core network node and sending a first probe tunnel set up instruction to the access network node for instructing the access network node to locally set up the probe tunnel towards the core network node based on the first F-TEID.

The core network may be or include a part of a packet-oriented network, such as a GPRS network. The core network node may be or comprised by any node of a core network, such as a serving node or a gateway node interfacing another network domain different from the core network. The probe tunnel may stretch through the complete core network (e.g., from an end facing an access network to an end facing a PDN or another access network) or through a portion thereof (e.g., from an end facing an access network to a serving node of the core network). Moreover, the probe tunnel may stretch from a first access network node, via the core network, to a second access network node.

The access network may be a Radio Access Network (RAN) conforming to the GSM, UMTS and/or LTE specifications. In such a case, the access network node may be configured as a Base Station (BS), for example as a NodeB or eNodeB, or a Radio Network Controller (RNC).

As understood herein, an F-TEID comprises a tunnel identifier for a given tunnel as well as address information pertaining to a particular network node acting as tunnel endpoint. The tunnel identifier permits to at least locally identify the given tunnel by the particular network node. According to the present disclosure, the term F-TEID is meant to include, but not to be limited to the particular definition in the applicable specifications of the 3$^{rd}$ Generation Partnership Project (3GPP). Accordingly, the term encompasses every identifier suitable to convey tunnel identity information on the one hand and related network node address information on the other.

In one implementation, the first probe tunnel set up instruction includes the first F-TEID. In another implementation, the first F-TEID is sent to the access network node in a separate messaging step (e.g., before, after or together with the first set up instruction).

A second probe tunnel set up instruction may sent to the core network node for instructing the core network node to locally set up the probe tunnel. The second probe tunnel set up instruction may be sent before, after or concurrently with the first probe tunnel set up instruction.

The probe tunnel may be set up by the core network node based on a second F-TEID associated with the access network node. The second F-TEID may be included in the second probe tunnel set up instruction or may be sent in a separate messaging step.

The individual F-TEIDs may be determined in various ways. In one variant, at least one of the first F-TEID and the second F-TEID is determined from a predetermined pool comprising one or more F-TEIDs specifically allocated for probing purposes. The individual network nodes may have a priori knowledge of the one or more F-TEIDs allocated for probing purposes. Such a priori knowledge may result from a configuration step preceding the probe tunnel set up signaling.

In another variant, the individual F-TEIDs are obtained from the individual network nodes. As an example, the step of determining the first F-TEID may comprise receiving the first F-TEID from the core network node (using, e.g., standardized procedures). The first F-TEID may be received from the core network node in response to receipt of the second probe tunnel set up instruction by the core network node. In a similar manner, determining the second F-TEID may comprise receiving the second F-TEID from the access network node.

Further probe tunnel set up instructions may be sent to other network nodes of the access network or the core network. As an example, a third probe tunnel set up instruction may be sent to a gateway node of the core network for instructing the gateway node to locally set up the probe tunnel (e.g., based on the first F-TEID). The gateway node may interface a network domain different from the core network, such a PND, and the core network node may be arranged between the access network node and the gateway node. As such, the resulting probe tunnel may stretch from the access network node, via the core network node, to the gateway node.

In one implementation, the gateway node is one of a PDN-Gw and a GGSN. Additionally, or in the alternative, the core network node may be a serving node, such as one of a S-Gw and a SGSM.

The steps of the method may be performed at least partially by an Operation Support Subsystem (OSS) or a Mobility Management Entity (MME). Additionally, one or more steps of the method may be performed by the OSS and one or more further steps may be performed by the MME. As an example, the OSS may instruct the MME to perform a standard tunnel set up procedure for the probe tunnel towards any core network node (e.g., the serving node and/or the gateway node). In such an implementation the transmission of an explicit probe tunnel set up instruction to the core network node may be omitted.

Once the probe tunnel has been set up, measurement data pertaining to probe traffic transmitted via the probe tunnel may be received. The measurement data may be received from one or more of the access network node, the core network node (e.g., the gateway node or the serving node) and a network node located in a network domain (e.g., a PDN) interfacing the core network via the gateway node. The measurement data may pertain to one or more of packet loss, delay, jitter, throughput and any other parameter of interest.

The technique presented herein may be performed in relation to a plurality of access network nodes. In such a case, a coordinated network probing via the resulting plurality of probe tunnels can be performed.

According to another aspect, a method of setting up a probe tunnel stretching from an access network node through a core network towards a core network node is presented, wherein the method is performed by the access network node and comprises receiving a probe tunnel set up instruction to locally set up the probe tunnel towards a core network node, wherein the instruction is accompanied by an F-TEID associated with the core network node, and setting up the probe tunnel towards the core network node based on the F-TEID associated with the core network node. As mentioned above, the F-TEID may be received together with the probe tunnel set up instruction or in a separate messaging step.

The method performed by the access network node may further comprise assigning the probe tunnel to a probe traffic generator. The probe traffic generator may be configured to generate probe traffic once the probe tunnel has been set up. Still further, the access network node may locally perform measurements pertaining to the probe traffic transmitted via the probe tunnel and may report the corresponding measurement data (e.g., statistics) to the OSS or any other network node.

Also provided is a computer program product comprising program code portions for performing the steps of any of the methods or method aspects disclosed herein when the computer program product is run on one or more computing devices. The computer program product may be stored on a computer readable recording medium such as a hard disk, CD-ROM or DVD. The computer program product may also be provided for download via a wireless or wired communication network.

According to a further aspect, a tunnel management control function apparatus for controlling set up of a probe tunnel stretching from an access network node through a core network towards a core network node is provided. The apparatus comprises a determination unit adapted to determine an F-TEID associated with a core network node and an instructing unit adapted to sent a probe tunnel set up instruction to the access network node to instruct the access network node to locally set up the probe tunnel towards the core network node based on the F-TEID.

The tunnel management control function apparatus may further comprise an interface adapted to receive measurement data pertaining to probe traffic transmitted via the probe tunnel. Additionally, an evaluation unit adapted to evaluate the measurement data thus received may be provided.

According to a still further aspect, a tunnel management handling function apparatus for an access network node is provided, wherein the apparatus is adapted to set up a probe tunnel stretching from the access network node through a core network towards a core network node and comprises an interface adapted to receive a probe tunnel set up instruction to locally set up the probe tunnel towards the core network node, wherein the instruction is accompanied by an F-TEID of the core network node. The apparatus further comprises a set up unit adapted to set up the probe tunnel towards the core network node based on the F-TEID associated with the core network node. The F-TEID may be received together with the probe tunnel set up instruction or during a separate messaging step.

The tunnel management handling function apparatus may further comprise a probe traffic generator adapted to be assigned to the probe tunnel. The probe traffic generator may be adapted to generate probe traffic that is transmitted, via the probe tunnel, towards the core network node. Moreover, a reporting unit may be present that is configured to transmit measurement data pertaining to the probe traffic to the OSS or any other network node. In one implementation, the measurement data pertains to reflected probe traffic that has been received from the tunnel management handling function apparatus via the probe tunnel.

BRIEF DESCRIPTION OF THE DRAWINGS

Further aspects, details and advantages of the technique presented herein will become apparent from the following description of preferred embodiments in conjunction with the drawings, wherein:

FIG. 3 a flow diagram illustrating a method embodiment of controlling set up of a probe tunnel;

FIG. 4 a flow diagram illustrating a method embodiment of handling set up a probe tunnel;

DETAILED DESCRIPTION

In the following description, for purposes of explanation and not limitation, specific details are set forth, such as particular network configurations and signaling procedures, in order to provide a thorough understanding of the technique presented herein. It will be apparent to one skilled in the art that the technique may be practiced in other embodiments that depart from these specific details. For example, while the following description will mainly focus on GPRS (including Evolved GPRS) core networks and LTE access networks, it will be appreciated that the technique presented herein could also be implemented in other kinds of core and access networks.

Those skilled in the art will further appreciate that the methods, functions and steps disclosed herein may be implemented in the form of software, hardware or a combination of software and hardware. As an example, the methods, functions and steps may be embodied in a processor (e.g., a microcontroller) and a memory coupled to the processor, wherein the memory is encoded with one or more programs that control the processor to perform the methods, steps and functions disclosed herein upon execution.

Figure 1:
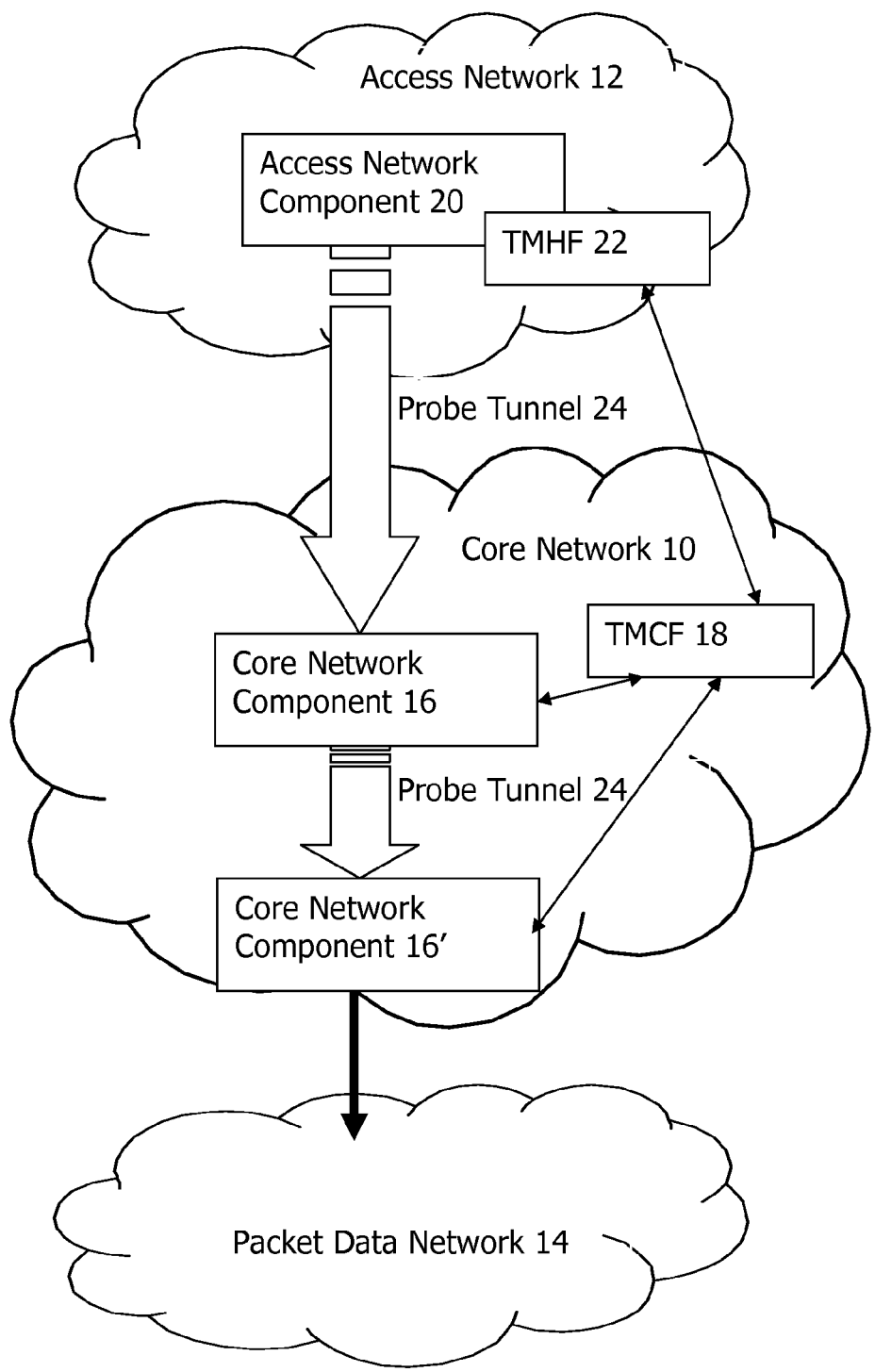
FIG. 1 illustrates a network system embodiment in which a probe tunnel is set up.

FIG. 1 schematically illustrates probe tunnel set up in a network system embodiment comprising a core network 10, an access network 12 as well as an optional packet data network 14. The core network 10 comprises one or multiple core network nodes 16, 16', such as serving nodes, gateway nodes, and so on. The core network 10 further comprises a Tunnel Management Control Function apparatus (TMCF) 18 in charge of probe tunnel set up control. Generally, the TMCF 18 is responsible for locally initiating probe tunnel set up in each network node that forms a probe tunnel endpoint. The TMCF 18 may be incorporated in any existing or dedicated control node of the core network 10 or any other control node, or may be distributed among two or more control nodes.

The access network 12 comprises an access network node 20 (e.g., a BS) and a Traffic Management Handling Function apparatus (TMHF) 22. The TMHF 22 is in charge of handling probe tunnel set up in the access network node 20. The TMHF 22 may be incorporated in the access network node 20 or in any other component of the access network 12 capable of communicating with the access network node 20.

It should be noted that the TMHF 22 could additionally be provided for core network nodes acting as tunnel endpoints (such as the core network nodes 16, 16') for a similar purpose and in a similar manner as will be described for the access network node 20 below. Alternatively, standard tunnel set up procedures as defined, for example, in the 3GPP specifications may be used for this purpose for network nodes different from the access network node 20.

As illustrated in FIG. 1, a communication link stretches between the TMCF 18 and the TMHF 22. A further communication link exists between the TMCF 18 and each core network node 16, 16' involved in the probe tunnel set up procedure. The communication link between the TMCF 18 and the TMHF 22 is used for communication purposes in the context of setting up a probe tunnel 24 from the access network node 20 through the core network 10 towards one or more of the core network nodes 16, 16'. In the present embodiment the probe tunnel 24 comprises multiple tunnel sections (i.e., a first section between the access network node 20 and the core network node 16 and a second section between the core network node 16 and a further node 16' of the core network 10). Each tunnel section is defined by two tunnel endpoints and associated F-TEIDs.

The structure and purpose of each of the TMCF 18 and the TMHF 22 will now be explained in more detail with reference to FIG. 2.

Figure 2:
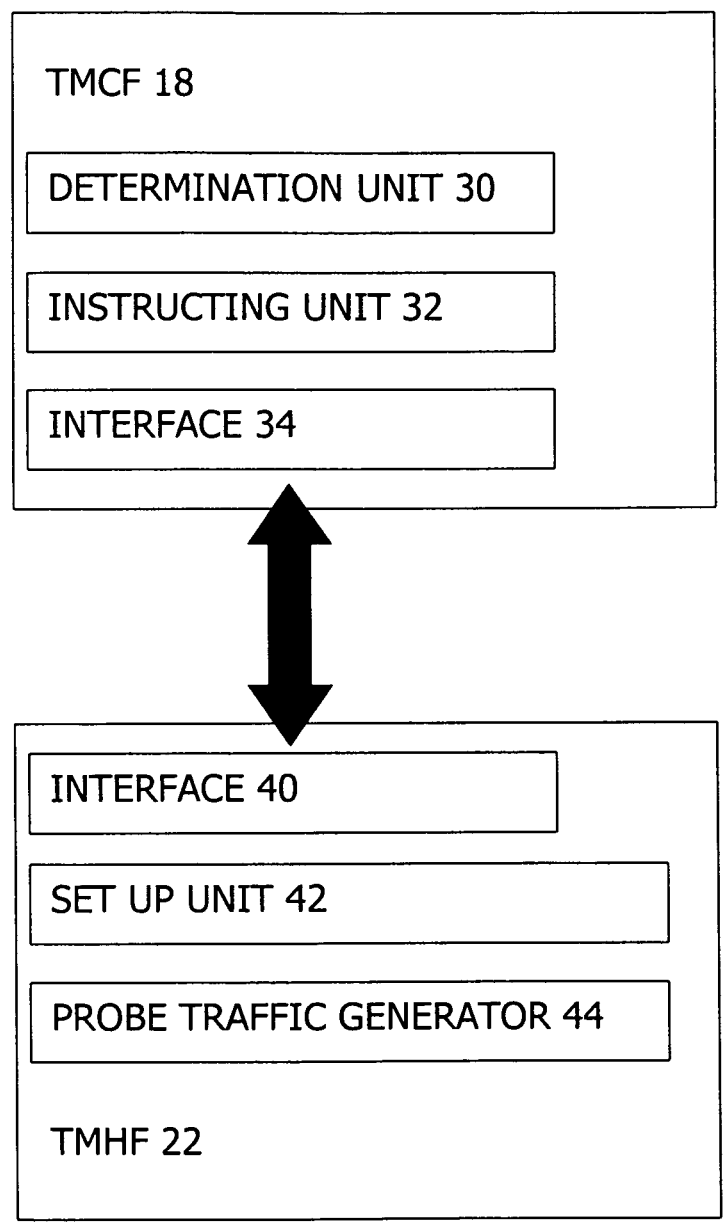
FIG. 2 an embodiment of a tunnel management control function apparatus and an embodiment of a tunnel management handling function apparatus.

As illustrated in FIG. 2, the TMCF 18 comprises a determination unit 30 adapted to determine an F-TEID associated with the core network node 16 and an instructing unit 32 adapted to send a probe tunnel set up instruction, via an interface 34, to the access network node 20. The probe tunnel set up instruction instructs the access network node 20 to locally set up the probe tunnel 24 towards the core network node 16 based on the F-TEID, and to initiate test traffic generation. Local probe tunnel set up may include one or several actions, including, for example, F-TEID handling (e.g., F-TEID storage or F-TEID-related messaging) and probe traffic generator assignment. In general, the actions to be performed for local probe tunnel set up will include one or more actions as defined in the applicable standard for tunnel set up in general.

The interface 34 is further adapted to receive measurement data pertaining to probe traffic transmitted via the probe tunnel 24 from, for example, the access network node 20 and the core network nodes 16, 16'. Measurement data may also be received from one or more network nodes located in the PDN 14.

As further shown in FIG. 2, the TMHF 22 comprises an interface 40 adapted to receive a probe tunnel set up instruction from the TMCF 18. The probe tunnel set up instruction is directed at a local set up of the probe tunnel 24 at the access network node 20 towards the core network node 16 and is accompanied by an F-TEID of the core network node 16. The TMHF 22 further comprises a set up unit 42 adapted to set up the probe tunnel 24 towards the core network node 16 based on the F-TEID associated with a core network node 16. Additionally, a probe traffic generator 44 is present that may be assigned to the probe tunnel 24 in response to receipt of the probe tunnel set up instruction.

In the following, the operation of the TMCF 18 and the TMHF 22 will be described in more detail with reference to the flow diagrams 300 and 400 illustrated in FIGS. 3 and 4 and with further reference to the three signaling diagrams of FIGS. 5, 6 and 7. The following embodiments will specifically be described for a GPRS-compliant core network 10, an LTE-compliant access network 12 as well as probe tunnel set up, or establishment, based on GTP-U. It should be noted that the access network 12 could also be implemented on the basis of, for example, the GSM or UMTS specifications. In a similar manner, the core network 10 could also be different from a GPRS (including Evolved GPRS in LTE/SAE) network.

Figure 5:
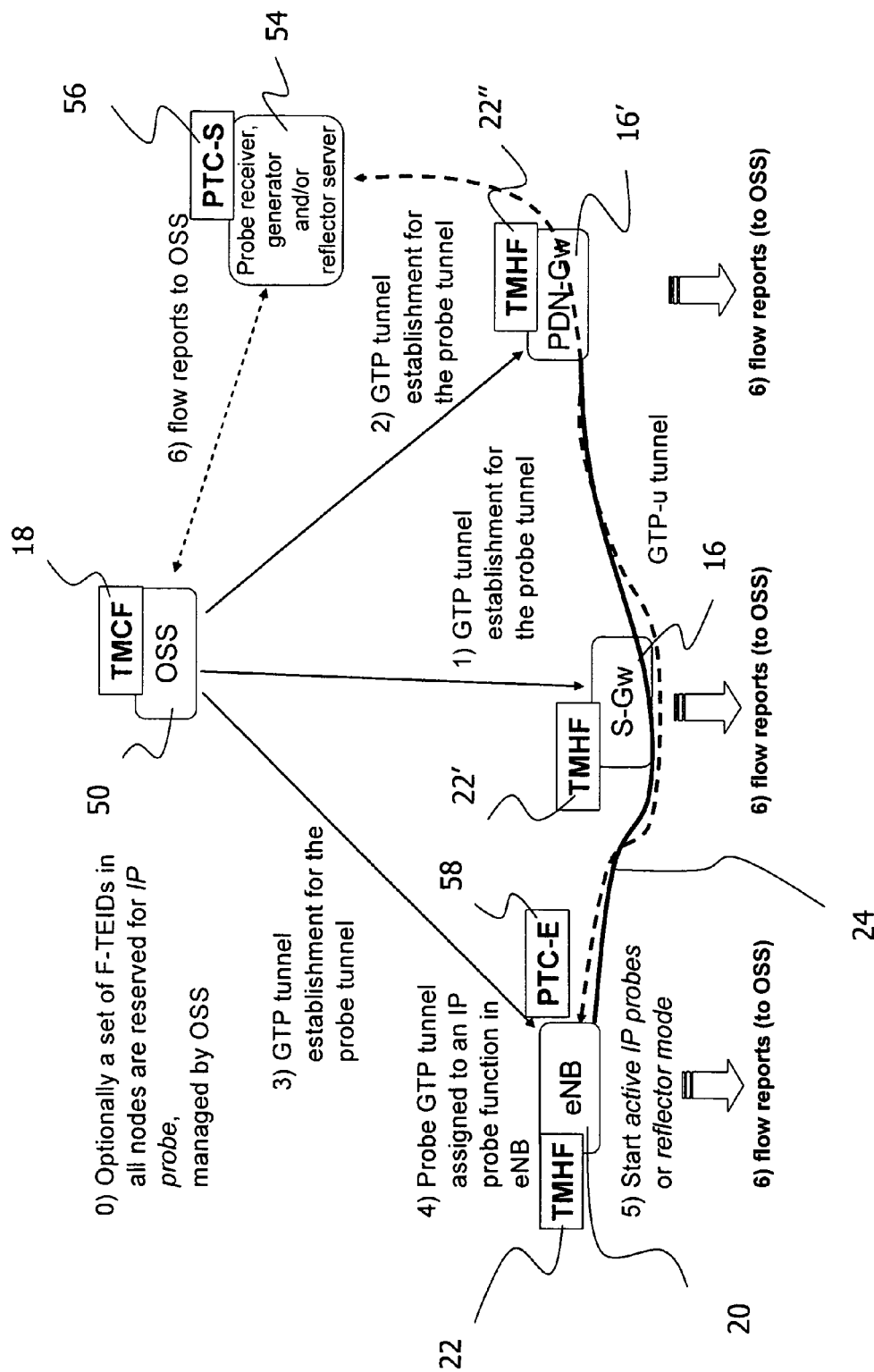
FIG. 5 a first signaling embodiment illustrating the set up of a probe tunnel.
Figure 6:
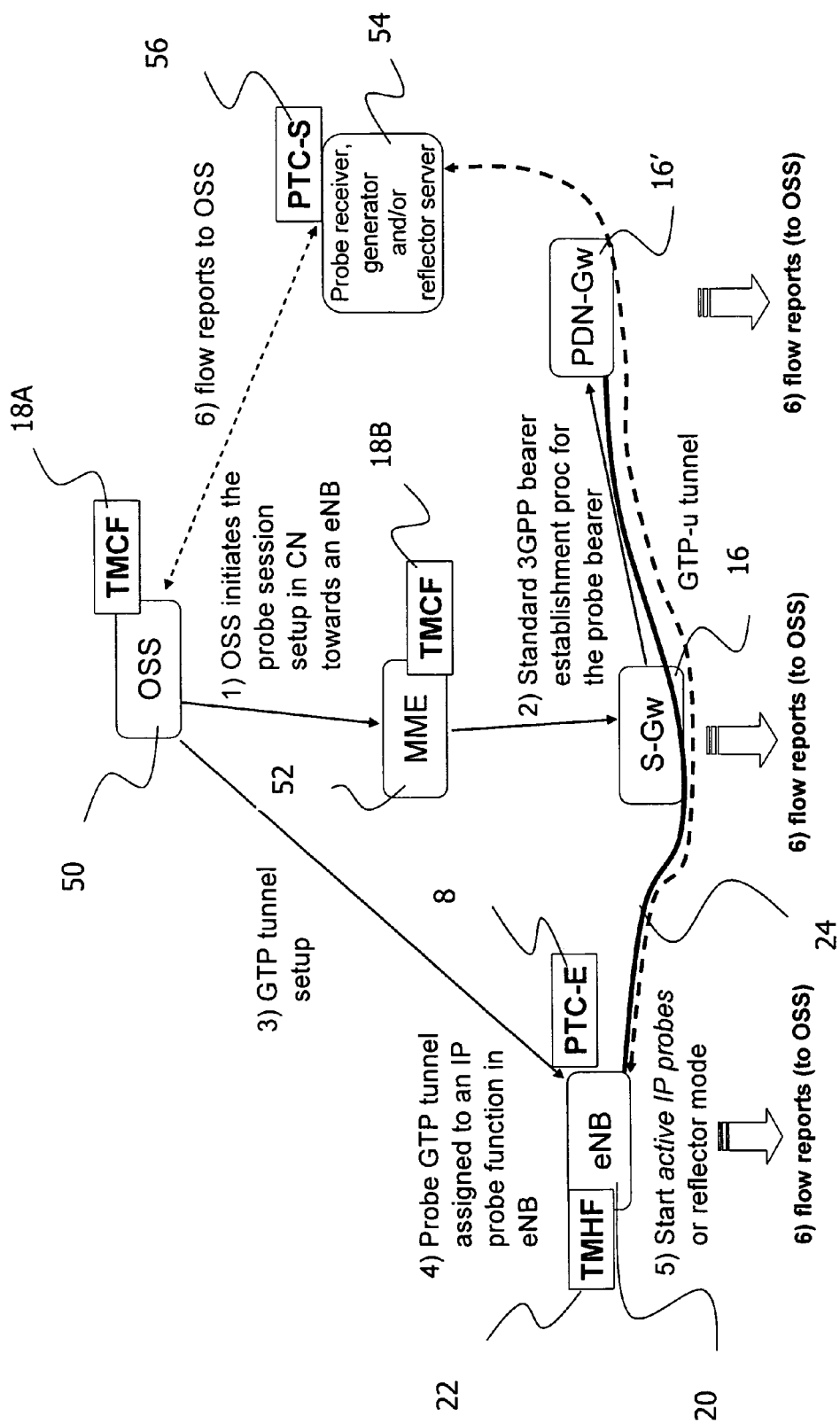
FIG. 6 a second signaling embodiment illustrating the set up of a probe tunnel.

As shown in FIGS. 4, 5 and 6, the main components of an LTE/GPRS implementation include an access network node in the form of an eNodeB 20, a first core network component in the form an S-Gw 16, a second core network component in the form of a PDN-Gw (or simply P-Gw) 16', as well as a first control node in the form of an OSS 50, and an optional second control node in the form on an MME 52. It should be noted that the first and second core network components 16, 16' could also be realized as SGSN and GGSN, respectively.

In the PDN, a further node 54 involved in network probing exists. This further node 54 may take the form of a server capable of acting as at least one of a probe traffic receiver, probe traffic receiver, probe traffic generator and probe traffic reflector. The node 54 may communicate with the P-Gw 16' via the Gi interface.

Both the PDN server 54 and the eNodeB 20 comprise a probe traffic handling function, namely a Probe Traffic Control Server (PTC-S) 56 and a Probe Traffic Control eNodeB (PTC-E) 58, respectively. Both the PTC-S 56 and the PTC-E 58 may potentially act as probe traffic generator, probe traffic reflector and Measurement Reporting Function (MRF). As for the eNodeB 20, the PTC-E 58 may thus realize the probe traffic generation function of the TMHF 22. Generally, probe traffic generation follows the conventional approaches. For example, voice-like probe traffic, probe traffic in the form of WWW-like TCP downloads, etc. may be generated by the PTC-S 56 and PTC-E 58.

Figure 7:
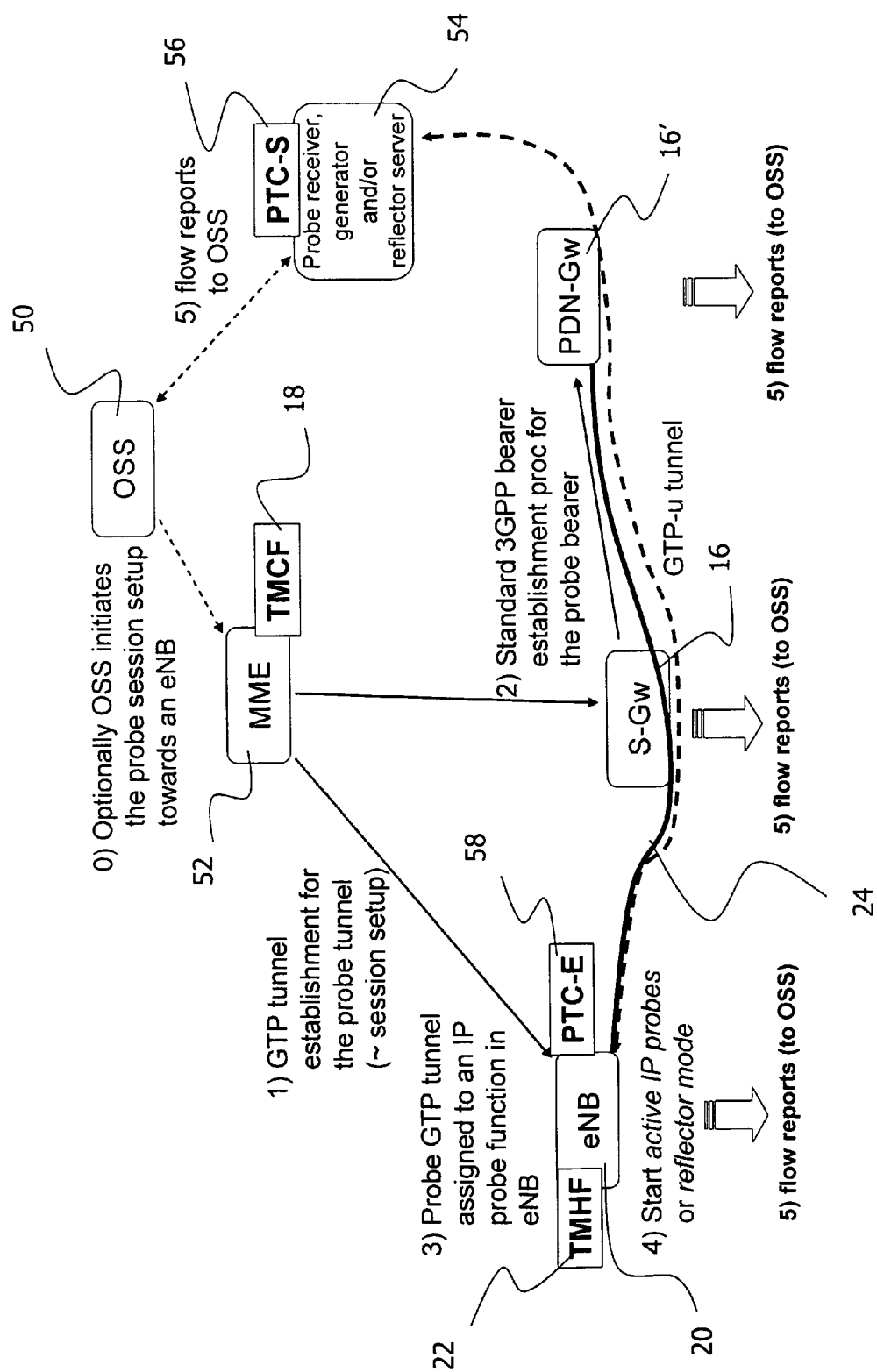
FIG. 7 a third signaling embodiment illustrating the set up of a probe tunnel.

Although not specifically shown in FIGS. 5, 6 and 7, any network node along the probe tunnel 24 may incorporate an MRF. The MRF may be configured to report measurement data, such as probe traffic statistics (e.g., probe packet statistics) to the OSS 50.

In the LTE/GPRS implementation, the TMCF 18 could either be implemented in the OSS 50 (see FIG. 4), in the MME 52 (see FIG. 6) or could be distributed between the OSS 50 and the MME 52 (see FIG. 5). The TMHF 22, on the other hand, will be implemented in the eNodeB 20. Additionally, the TMHF 22 may be implemented in the S-Gw 16 and P-Gw 16' (see FIG. 5). Alternatively, standard tunnel handling functions as defined in the 3GPP specifications may be utilized by the core network nodes 16, 16' (see FIGS. 6 and 7).

The signaling diagram of FIG. 5 illustrates probe tunnel set up under control of the OSS 50. In the embodiment illustrated in FIG. 5, an MME is thus not involved.

Initially, the TMCF 18 in the OSS 50 uses conventional or dedicated messaging steps (not illustrated in FIG. 5) to determine the F-TEIDs of the eNodeB 20, the S-Gw 16 and P-Gw 16' for probe tunnel set up purposes. Thus, according to step 302 in flow diagram 300 of FIG. 3, the F-TEID of at least the S-Gw 16 is determined. In this regard, 3GPP signaling procedures for F-TEID determination may be performed by the TMCF 18. The corresponding signaling procedures can be omitted if there exists a set of F-TEIDs of all network nodes participating in the probe tunnel set up procedure (i.e., tunnel endpoints) that are reserved for such probe tunnels. In such a case, the TMCF 18 of the OSS 50 may keep track of all F-TEIDs allocated for probing purposes in the different network nodes and request the network nodes, via probe tunnel set up instructions, to assign the pre-allocated F-TEIDs to the probe tunnels.

With reference to FIG. 5, in a first signaling phase 1), the TMCF 18 in the OSS 50 requests the TMHF 22' in the S-Gw 16 to set up the probe tunnel 24 locally. To this end, a probe tunnel set up instruction including the previously acquired (e.g., pre-allocated) F-TEIDs of the eNodeB 20 and the P-Gw 16' is sent to the S-Gw 16. Receipt of the probe tunnel set up instruction triggers the S-Gw 16 to return its F-TEID for the probe tunnel 24 that needs to be set up. It should be noted that the F-TEIDs of the NodeB 20, the S-Gw 16 and the P-Gw 16' need not be transmitted in case there exists a set of pre-allocated F-TEIDs for probing purposes (see signaling phase 0, in FIG. 5).

In the next signaling phase 2), the TMCF 18 in the OSS 50 requests the TMHF 22" in the P-Gw 16' to set up the probe tunnel 24 locally. The corresponding probe tunnel set up instruction may be accompanied by the F-TEIDs of the S-Gw 16 as received from the S-Gw 16 in the signaling phase 1) or as pre-allocated for probing purposes.

Then, in signaling phase 3), the TMCF 18 in the OSS 50 requests the TMHF 22 in the eNodeB 20 to set up the probe tunnel 24 locally. A probe tunnel set up instruction is sent to the eNodeB 20 in this regard as indicated by step 304 in flow diagram 300. The probe tunnel set up instruction may include the F-TEID of the S-Gw 16 as received from the S-Gw 16 in signaling phase 1) or as pre-allocated by the S-Gw 16 for probing purposes. Receipt of the probe tunnel set up instruction by the eNodeB 20 corresponds to step 402 in flow diagram 400 of FIG. 4. In response to receipt of the probe tunnel set up instruction from the TMCF 18 in the OSS 50, the TMHF 22 in the eNodeB 20 sets up the probe tunnel 24 towards the S-Gw 16 based on the F-TEID associated with the S-Gw 16 as illustrated by step 404 in flow diagram 400.

Then, in signaling phase 4), the TMHF 22 in the eNodeB 20 assigns the probe tunnel 24 that has been set up towards the S-Gw 16 to the probe traffic generator of the PTC-E 58. In signaling phase 5) the PTC-E 58 starts generating probe traffic for IP packet probing with respect to the probe tunnel 24. The corresponding probe traffic is routed through the S-Gw 16 and through the P-Gw 16'. From the P-Gw 16' the probe traffic may be forwarded in the PDN to the server 54. The PTC-S 56 in the server 54 may operate in a reflector mode and reflect the probe traffic back towards the eNodeB 20.

In signaling phase 6), the PTC-E 58, PTC-S 56 and optional MRF functions along the probe tunnel 24 (e.g., within the S-Gw 16 and/or the P-Gw 16') provide flow reports including measurement data (e.g., IP packet statistics) to the OSS 50 for network traffic and transmission path analysis.

As illustrated in the signaling diagram of FIG. 6, the TMCF functionalities may be distributed between the OSS 50 and the MME 52. Thus, a first TMCF portion 18A may be located in the OSS 50, and a second TMCF portion 18B may be located in the MME 52. The TMCF portion 18A in the OSS 50 uses proprietary protocols in accordance with the present disclosure to communicate with the TMCF portion 18B in the MME 52 and the TMHF 22 in the eNodeB 20. On the other hand, the MME 52 uses 3GPP standard procedures for probe tunnel set up. In other words, the S-Gw 16 and the P-Gw 16' may not be aware that a particular tunnel 24 that is locally set up by them will actually be used for probing purposes. Rather, the S-Gw 16 and the P-Gw 16' will implement standard tunnel set up procedures (and can thus be set up like legacy nodes). Thus, the TMHF is not to be implemented in the core network nodes such as the S-Gw 16 and P-Gw 16'.

With reference to FIG. 6, in a first signaling phase 1), the TMCF portion 18A in the OSS 50 initiates a probe session set up in the core network towards an eNodeB 20. To this end a corresponding session initiation message (probe session request) is sent to the TMCF portion 18B in the MME 52. As has already been explained with reference to the signaling diagram of FIG. 5, the TMCF portion 18A in the OSS 50 may in a previous messaging step have obtained the F-TEIDs of all network nodes participating in the probe tunnel set up (or may have determined such F-TEIDs from an F-TEID pool pre-allocated for probing purposes) in accordance with step 302 in flow diagram 300.

In response to receipt of the probe session request from the OSS 50 in the first signaling phase 1), the MME 52 will initiate a standard 3GPP session establishment procedure towards the S-Gw 16 for tunnel set up in signaling phase 2). The S-Gw 16 will then set up the tunnel session in the core network with the P-Gw 16'. Alternatively, or in addition, the F-TEID of the P-Gw 16' may be communicated to its peer node (the S-Gw 16) via the standard 3GPP protocols.

As for the eNodeB 20, the F-TEID for probing purposes may be pre-allocated (which is feasible since the eNodeB 20 comprises the proprietary TMHF 22, whereas the S-Gw 16 and P-Gw 16' may be set up as legacy nodes). Alternatively, the OSS 50 could in an initial signaling phase 0) preceding the first signaling phase 1) request the eNodeB 20 to allocate a local F-TEID for probe tunnel set up. The locally allocated F-TEID of the eNodeB 20 may then be distributed towards the S-Gw 16 and P-Gw 16' subsequently (e.g., in signaling steps 1) and 2)).

In a next signaling phase 3), the TMCF portion 18A in the OSS 50 sends a probe tunnel set up instruction to the TMHF 22 in the eNodeB 20 (see step 304 in flow diagram 300). The tunnel set up instruction may be accompanied by the F-TEID assigned by the S-Gw 16 for the (probe) tunnel 24 to be set up and instructs the eNodeB 20 to locally set up the probe tunnel 24 towards the S-Gw 16. The probe tunnel set up instruction received by the TMHF 22 of the eNodeB 20 (see step 402 of the flow diagram 400 of FIG. 4) triggers the eNode 20 to set up the probe tunnel 24 towards the S-Gw based on the F-TEID associated with the S-Gw 16 as illustrated by step 404 of flow diagram 400 of FIG. 4.

Signaling phases 4), 5) and 6) are the same as the corresponding signaling phases illustrated in FIG. 5. For this reason a more detailed description thereof is omitted here.

According to the signaling diagram illustrated in FIG. 7, the TMCF 18 is realized in the MME 52. In this implementation, the signaling with respect to probe tunnel set up is handled in the MME 52, which has full control over the probe tunnel set up procedure. In a similar manner as described above with reference to FIG. 6, the TMHF 22 is only implemented in the eNodeB 20, but not in the S-Gw 16 or the P-Gw 16'.

The probe tunnel set up procedure may be triggered by receipt of an optional probe session set up request from the OSS 50 by the TMCF 18 in the MME 52. In a signaling phase not illustrated in FIG. 7, the TMCF 18 in the MME 52 may then determine the F-TEIDs of all network nodes involved in the (probe) tunnel set up procedure. The subsequent signaling phases (1) to (5) corresponds to the signaling phase (2) to (6) discussed above with reference to FIG. 6, respectively, but now involving the TMCF 18 in the MME 52 (the F-TEID of the eNodeB 20 is allocated as part of signaling phase 1) as discussed above and communicated to the S-Gw 16 in signaling phase 2). For this reason, a more detailed description thereof is omitted here.

As has become apparent from the above description of exemplary embodiments, the technique presented herein permits a comparatively simple set up of probe tunnels for network probing purposes. In certain scenarios (see FIGS. 6 and 7), probe tunnel set up remains transparent for the core network nodes that form tunnel endpoints (such as the S-Gw and the P-Gw). Nonetheless, the probe traffic is actually routed through the S-Gw (or a functionally equivalent SGSN) and P-Gw (or a functionally equivalent GGSN), so that also path performance through such network nodes becomes possible to analyze. Additionally, network nodes (such as PDN servers) above the P-Gw (or GGSN) on the Gi interface can be monitored and anlysed with respect to, for example, path performance. Still further, since probe tunnel set up and start of probe traffic generation can be centralized (by involving one or more central control nodes such as the OSS and the MME), it is possible to perform coordinated network probing involving a plurality of radio access nodes at a time.

The technique presented herein may be embodied in many different forms, not all of which are described above, and all such forms are contemplated to be within the scope of the present invention. The particular embodiments described above are merely illustrative and should not be considered restrictive in any way. The scope of the present invention is determined by the claims that follow, and all variations and equivalents that fall within the range of the claims are intended to be embraced therein.

The invention claimed is:

1. A method of controlling set up of a probe tunnel used for probing purposes stretching from an access network node through a core network towards a core network node, the method comprising:
    determining a first Fully Qualified Tunnel Endpoint Identifier, F-TEID, associated with the core network node;
    sending a first probe tunnel set up instruction to the access network node for instructing the access network node to locally set up the probe tunnel towards the core network node based on the first F-TEID; and
    sending a second probe tunnel set up instruction to the core network node for instructing the core network node to locally set up the probe tunnel based on a second F-TEID associated with the access network node;
    wherein at least one of the first F-TEID and the second F-TEID is determined from a predetermined pool of F-TEIDs pre-allocated to network nodes participating in the probe tunnel setup.

2. The method of claim 1, wherein the first probe tunnel set up instruction includes the first F-TEID.

3. The method of claim 1, wherein the second F-TEID is included in the second probe tunnel set up instruction.

4. The method of claim 1, further comprising requesting the network nodes to assign the pre-allocated F-TEIDs to one or more probe tunnels via one or more probe tunnel setup instructions.

5. The method of claim 1, wherein determining the first F-TEID comprises receiving the first F-TEID from the core network node.

6. The method of claim 1, wherein the first F-TEID is received from the core network node in response to instructing the core network node to locally set up the probe tunnel.

7. The method of claim 1, further comprising sending a third probe tunnel set up instruction to a gateway node for instructing the gateway node to locally set up the probe tunnel based on the first F-TEID, wherein the core network node is arranged between the access network node and the gateway node and wherein the gateway node interfaces with a network domain different from the core network.

8. The method of claim 7, wherein the gateway node is one of a Packet Data Network Gateway, PDN-Gw, and a Gateway General Packet Radio Service Support Node, GGSN.

9. The method of claim 1, wherein the core network node is one of a Serving Gateway, S-Gw, and a Serving General Packet Radio Service Support Node, SGSN.

10. The method of claim 1, wherein the steps are at least partially performed by at least one of a Operation Support Subsystem, OSS, and a Mobility Management Entity, MME.

11. The method of claim 10, wherein the OSS instructs the MME to perform a standard tunnel set up procedure as defined in 3GPP for the probe tunnel towards the core network node.

12. The method of claim 1, further comprising receiving measurement data pertaining to probe traffic transmitted via the probe tunnel that has been set up.

13. The method of claim 1, further comprising performing the steps in relation to a plurality of access network nodes for a coordinated probing via the resulting plurality of probe tunnels.

14. A computer readable recording medium storing a computer program product comprising program code that, when executed by tunnel management control function apparatus, configures the apparatus to control set up of a probe tunnel used for probing purposes stretching from an access network node through a core network towards a core network node, said program code comprising instructions to:
 determine a first Fully Qualified Tunnel Endpoint Identifier, F-TEID, associated with the core network node;
 send a first probe tunnel set up instruction to the access network node for instructing the access network node to locally set up the probe tunnel towards the core network node based on the first F-TEID; and
 send a second probe tunnel set up instruction to the core network node for instructing the core network node to locally set up the probe tunnel based on a second F-TEID associated with the access network node;
 wherein at least one of the first F-TEID and the second F-TEID is determined from a predetermined pool of F-TEIDs pre-allocated to network nodes participating in the probe tunnel setup.

15. A tunnel management control function apparatus for controlling set up of a probe tunnel used for probing purposes stretching from an access network node through a core network towards a core network node, the apparatus comprising:
 a determination unit adapted to determine a first Fully Qualified Tunnel Endpoint Identifier, F-TEID, associated with the core network node; and
 an instructing unit adapted to send a first probe tunnel set up instruction to the access network node to instruct the access network node to locally set up the probe tunnel towards the core network node based on the first F-TEID, and send a second probe tunnel set up instruction to the core network node for instructing the core network node to locally set up the probe tunnel based on a second F-TEID associated with the access network node;
 wherein the determination unit is further adapted to determine at least one of the first F-TEID and the second F-TEID from a predetermined pool of F-TEIDs to be pre-allocated to network nodes participating in the probe tunnel setup.

16. The tunnel management control function apparatus of claim 15, further adapted to request the network nodes to assign the pre-allocated F-TEIDs to one or more probe tunnels via one or more probe tunnel setup instructions.

17. The tunnel management control function apparatus of claim 15, further comprising an interface adapted to receive measurement data pertaining to probe traffic transmitted via the probe tunnel.

* * * * *

UNITED STATES PATENT AND TRADEMARK OFFICE
CERTIFICATE OF CORRECTION

PATENT NO.        : 9,215,603 B2                                    Page 1 of 1
APPLICATION NO.   : 14/007277
DATED             : December 15, 2015
INVENTOR(S)       : Borsos et al.

It is certified that error appears in the above-identified patent and that said Letters Patent is hereby corrected as shown below:

IN THE SPECIFICATION

In Column 3, Lines 53-54, delete "a S-Gw and a SGSM." and insert -- an S-Gw and an SGSN. --, therefor.

In Column 5, Line 24, delete "FIG. 2 an" and insert -- FIG. 2 is an --, therefor.

In Column 5, Line 27, delete "FIG. 3 a" and insert -- FIG. 3 is a --, therefor.

In Column 5, Line 29, delete "FIG. 4 a" and insert -- FIG. 4 is a --, therefor.

In Column 5, Line 31, delete "FIG. 5 a" and insert -- FIG. 5 is a --, therefor.

In Column 5, Line 33, delete "FIG. 6 a" and insert -- FIG. 6 is a --, therefor.

In Column 5, Line 35, delete "FIG. 7 a" and insert -- FIG. 7 is a --, therefor.

In Column 8, Lines 21-22, delete "phase 0," and insert -- phase 0), --, therefor.

In Column 10, Line 18, delete "anlysed" and insert -- analysed --, therefor.

Signed and Sealed this
Fifth Day of April, 2016

Michelle K. Lee
*Director of the United States Patent and Trademark Office*